(12) United States Patent
Nadella et al.

(10) Patent No.: US 8,858,849 B2
(45) Date of Patent: Oct. 14, 2014

(54) METHODS AND PRESSURE VESSELS FOR SOLID-STATE MICROCELLULAR PROCESSING OF THERMOPLASTIC ROLLS OR SHEETS

(71) Applicants: Krishna V. Nadella, Redmond, WA (US); Steven Powers, Everett, WA (US); Thomas Malone, Bellingham, WA (US)

(72) Inventors: Krishna V. Nadella, Redmond, WA (US); Steven Powers, Everett, WA (US); Thomas Malone, Bellingham, WA (US)

(73) Assignee: MicroGREEN Polymers Inc., Arlington, WA (US)

( * ) Notice: Subject to any disclaimer, the term of this patent is extended or adjusted under 35 U.S.C. 154(b) by 0 days.

(21) Appl. No.: 13/948,936

(22) Filed: Jul. 23, 2013

(65) Prior Publication Data
US 2013/0303643 A1    Nov. 14, 2013

Related U.S. Application Data

(63) Continuation of application No. 13/300,445, filed on Nov. 18, 2011, now Pat. No. 8,517,709.

(60) Provisional application No. 61/061,539, filed on Jun. 13, 2008.

(51) Int. Cl.
| | | |
|---|---|---|
| *B29C 44/34* | (2006.01) | |
| *C08J 9/12* | (2006.01) | |
| *C08J 9/00* | (2006.01) | |

(52) U.S. Cl.
CPC ............... *C08J 9/00* (2013.01); *C08J 2203/06* (2013.01); *C08J 9/122* (2013.01); *C08J 2201/032* (2013.01); *B29C 44/3446* (2013.01); *B29C 44/3453* (2013.01)
USPC .......................................................... 264/51

(58) Field of Classification Search
CPC ............ B29C 44/3446; B29C 44/3453; B29C 44/5618; C08J 9/122
USPC ............................................ 264/51; 425/4 C
See application file for complete search history.

(56) References Cited

U.S. PATENT DOCUMENTS

| | | |
|---|---|---|
| 1,948,568 A | 2/1934 | Faber |
| 2,317,448 A | 4/1943 | Dreyfus |

(Continued)

FOREIGN PATENT DOCUMENTS

| | | |
|---|---|---|
| EP | 0371392 A2 | 6/1990 |
| EP | 1055499 A1 | 11/2000 |

(Continued)

OTHER PUBLICATIONS

Wang, "Solvent-free Fabrication of Porous Polymer for Tissue Engineering Applications," University of Washington, Dept. of Mechanical Engineering (dissertation), 2007.

(Continued)

*Primary Examiner* — Alison Hindenlang
(74) *Attorney, Agent, or Firm* — John M. Janeway; Janeway Patent Law PLLC

(57) ABSTRACT

Disclosed herein are methods and pressure vessels for solid-state microcellular processing of thermoplastic rolls and sheets. In one embodiment, the present invention is directed to a method for making a gas impregnated interleaved roll, which method comprises: providing a pressure vessel having an internal pressure chamber and a rotatable shaft horizontally positioned within the pressure chamber; placing an interleaved roll about the rotatable shaft and within the pressure chamber, wherein the interleaved roll is made from a thermoplastic material sheet interleaved together with a gas-channeling material sheet; pressurizing the pressure chamber to a selected pressure; rotating the rotatable shaft having the interleaved roll thereabouts (thereby rotating the interleaved roll) while under pressure for a selected period of time; and depressurizing the internal chamber to yield the gas impregnated interleaved roll. In other embodiments, the invention is directed to multi-chambered pressure vessels for gas impregnation of thermoplastic rolls, sheets, and films.

3 Claims, 5 Drawing Sheets

(56) References Cited

U.S. PATENT DOCUMENTS

| | | |
|---|---|---|
| 2,629,312 A | 2/1953 | Davis |
| 3,244,537 A | 4/1966 | Cease |
| 3,260,781 A | 7/1966 | Lux |
| 3,364,519 A | 1/1968 | Pitsch |
| 3,610,000 A | 10/1971 | Lopata |
| 3,617,311 A | 11/1971 | Beltle |
| 3,744,402 A | 7/1973 | Piegza |
| 3,846,526 A | 11/1974 | Wade |
| 3,883,625 A | 5/1975 | Thomas |
| 3,895,911 A | 7/1975 | Prins |
| 3,937,777 A | 2/1976 | Wienand |
| 3,955,482 A | 5/1976 | Moen |
| 4,003,302 A | 1/1977 | Mencacci |
| 4,074,941 A | 2/1978 | Jablonski |
| 4,284,596 A | 8/1981 | Inokuchi |
| 4,304,747 A | 12/1981 | Lake |
| 4,335,609 A | 6/1982 | Saulsbury |
| 4,386,188 A | 5/1983 | Grancio |
| 4,424,287 A | 1/1984 | Johnson |
| 4,473,665 A | 9/1984 | Martini-Vvedensky |
| D277,632 S | 2/1985 | Staufenberg |
| 4,608,009 A | 8/1986 | Whiteside |
| 4,693,856 A | 9/1987 | Rubens |
| 4,756,091 A | 7/1988 | Van Denend |
| 4,761,256 A | 8/1988 | Hardenbrook |
| 4,848,543 A | 7/1989 | Doboze |
| 4,886,563 A | 12/1989 | Bennett |
| 4,911,869 A | 3/1990 | Meyer |
| 4,981,631 A | 1/1991 | Cheung |
| 5,128,202 A | 7/1992 | Subramanian |
| 5,145,107 A | 9/1992 | Silver |
| 5,158,986 A | 10/1992 | Cha |
| 5,160,674 A | 11/1992 | Colton |
| 5,172,443 A | 12/1992 | Christ |
| 5,182,307 A | 1/1993 | Kumar |
| 5,207,008 A | 5/1993 | Wimberger |
| 5,217,660 A | 6/1993 | Howard |
| 5,223,545 A | 6/1993 | Kumar |
| 5,303,484 A | 4/1994 | Hagen |
| 5,334,356 A | 8/1994 | Baldwin |
| 5,362,436 A | 11/1994 | Wagner |
| 5,364,696 A | 11/1994 | Wagner |
| 5,369,135 A | 11/1994 | Campbell |
| 5,437,846 A | 8/1995 | Roumagnac |
| 5,640,784 A | 6/1997 | Rocheleau |
| 5,723,510 A | 3/1998 | Kabumoto |
| 5,747,085 A | 5/1998 | Veltman |
| 5,835,657 A | 11/1998 | Suarez |
| 5,844,731 A | 12/1998 | Kabumoto |
| 5,867,920 A | 2/1999 | Rogne |
| 5,904,946 A | 5/1999 | Kemp |
| 5,955,014 A | 9/1999 | Raukola |
| 6,012,583 A | 1/2000 | Ramirez |
| 6,083,580 A | 7/2000 | Finestone |
| D476,861 S | 7/2003 | Zettle |
| 6,656,671 B1 | 12/2003 | Aylward |
| 6,884,823 B1 | 4/2005 | Pierick |
| 6,948,378 B2 | 9/2005 | Solberg |
| 7,083,845 B1 | 8/2006 | Albrecht |
| 7,699,216 B2 | 4/2010 | Smith |
| 2001/0020513 A1 | 9/2001 | Tupil |
| 2001/0032903 A1 | 10/2001 | Durrance |
| 2002/0168509 A1 | 11/2002 | Desimone |
| 2003/0130364 A1 | 7/2003 | Vo |
| 2004/0005449 A1 | 1/2004 | Sugimoto |
| 2004/0250628 A1 | 12/2004 | Solberg |
| 2005/0035495 A1 | 2/2005 | Baker |
| 2005/0058824 A1 | 3/2005 | Fujimoto |
| 2005/0181196 A1 | 8/2005 | Aylward |
| 2005/0203198 A1 | 9/2005 | Branch |
| 2005/0214512 A1 | 9/2005 | Fascio |
| 2006/0073298 A1 | 4/2006 | Hutchinson |
| 2006/0144915 A1 | 7/2006 | Sadlier |
| 2006/0257606 A1 | 11/2006 | Branch |
| 2006/0284331 A1 | 12/2006 | Branch |
| 2008/0087715 A1 | 4/2008 | Robertson |
| 2008/0274346 A1 | 11/2008 | Miller |
| 2008/0277817 A1 | 11/2008 | Miller |
| 2008/0280123 A1 | 11/2008 | Miller |
| 2009/0065136 A1 | 3/2009 | Nadella |
| 2009/0104420 A1 | 4/2009 | Nadella |
| 2010/0028654 A1 | 2/2010 | Takase |
| 2010/0062235 A1 | 3/2010 | Nadella |
| 2011/0081524 A1 | 4/2011 | Nadella |
| 2011/0195165 A1 | 8/2011 | Cahill |
| 2012/0055108 A1 | 3/2012 | Bierwirth |

FOREIGN PATENT DOCUMENTS

| | | |
|---|---|---|
| EP | 1636008 A2 | 3/2006 |
| JP | 11-170288 | 6/1999 |
| WO | WO 01-36521 A2 | 5/2001 |
| WO | WO2004103675 A1 | 12/2004 |
| WO | WO2004104072 A2 | 12/2004 |
| WO | WO 2009/036328 A2 | 3/2009 |
| WO | WO 2011133568 | 10/2011 |

OTHER PUBLICATIONS

Kumar, "A model for the unfoamed skin on microcellular foams", 1994, Polymer Engineering & Science 34(3) pp. 169-173.

Holl "A steady-state mass balance model of the polycarbonate CO2 System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. II, pp. 2189-2192.

Holl "An in situ study of plasticization of polymers by high-pressure gases", 1998, Journal of Polymer Science Part A: polymer chemistry 36(6) p. 977-982.

International Search Report for Application No. PCT/US2008/051360 dated Sep. 26, 2008.

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical CO2", Cellular Polymers: Heriot-Watt University, Mar. 23-25, 1993, 1993: p. 25.

Seeler, "Net-shape sintered microcellular foam parts, SPE Technical Papers", vol. XLIII, 1997, pp. 2032-2036.

Young, "Polymer-Solvent Phase Separation as a Route to Low Density, Microcellular Plastic Foams", Journal of Cellular Plastics, 1987. 23(1): p. 55.

Martini, "The Production and Analysis of Microcellular Foam", Massachusetts Institute of Technology; Dept. of Mechanical Engineering (dissertation) 1981.

International Search Report for application No. PCT/US12/22963 dated May 15, 2012.

International Search Report for application No. PCT/US11/48270 dated Jan. 25, 2012.

International Search Report for application No. PCT/2013/034663 dated Jun. 26, 2013.

International Search Report PCT/US2014/011534 mailed May 12, 2014.

METHODS AND PRESSURE VESSELS FOR SOLID-STATE MICROCELLULAR PROCESSING OF THERMOPLASTIC ROLLS OR SHEETS

CROSS-REFERENCE TO RELATED APPLICATIONS

This application claims priority from commonly owned:
U.S. Provisional Patent Application No. 61/436,902 filed 13 Jun. 2008 and titled "Microstructures of Fusion-Bonded Microcellular Thermoplastic Articles",
U.S. patent application Ser. No. 12/484,980 (now U.S. Pat. No. 8,080,194) filed 15 Jun. 2009 and titled "Methods And Pressure Vessels For Solid-State Microcellular Processing Of Thermoplastic Rolls Or Sheets", and
currently pending U.S. patent application Ser. No. 13/300,445 filed 18 Nov. 2011 and titled "Methods and Pressure Vessels for Solid-State Microcellular Processing of Thermoplastic Rolls or Sheets"
All three of which are incorporated herein by reference in their entirety.

TECHNICAL FIELD

The present invention relates generally to the foaming of plastic materials and, more specifically, to methods and pressure vessels for solid-state microcellular processing of thermoplastic rolls, sheets or films.

BACKGROUND OF THE INVENTION

Microcellular plastic-foam refers to a polymer that has been specially foamed to thereby create micro-pores or cells (also sometime referred to as bubbles). The common definition includes foams having an average cell size on the order of 10 microns in diameter, and typically ranging from about 0.1 to about 100 microns in diameter. In comparison, conventional plastic foams typically have an average cell diameter ranging from about 100 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer superior mechanical properties at reduced material weights and costs.

The process of making microcellular plastic foams has been developed based on a thermodynamic instability causing cell nucleation (J. E. Martini, S M Thesis, Department of Mech. Eng., MIT, Cambridge, Mass. (1981)). First, a polymer is saturated with a volatile foaming agent at a high pressure. Then, by means of a rapid pressure drop, the solubility of foaming agent impregnated within the polymer is decreased, and the polymer becomes supersaturated. The system is heated to soften the polymer matrix and a large number of cells are nucleated. The foaming agent diffuses outwards and into a large number of small cells. Stated somewhat differently, microcellular plastic foam may be produced by saturating a polymer with a gas or supercritical fluid and using a thermodynamic instability, typically a rapid pressure drop, to generate billions of cells per cubic centimeter (i.e., bubble density of greater than $10^8$ cells per cubic centimeter) within the polymer matrix.

Conventional solid-state microcellular processing is known to involve a two-stage batch process. In the first stage (absorption), a solid polymer is saturated with high pressure inert gas (e.g., $CO_2$) in a pressure vessel until a desired gas concentration level is achieved throughout the polymer matrix. Once the gas-polymer mixture is removed from the pressure vessel into ambient environment (desorption), a supersaturated specimen is produced that is thermodynamically unstable due to the excessive concentration of gas in the polymer. In the second stage (foaming), the gas-polymer mixture is heated in a hot water bath or some other heating medium (e.g., hot air, steam, infrared radiation, etc.) at a temperature close to the glass transition temperature ($T_g$) of the gas-polymer mixture in order to induce microcellular bubble nucleation and growth.

The success of the batch process in producing discrete units of thermoplastic material has not, however, been duplicated in large scale production involving continuous rolls, sheets or films of thermoplastic material. To scale-up the batch process for industrial production, several patented methods have been issued for thermoplastic processing. Exemplary in this regard are the following:

U.S. Pat. No. 5,158,986 to Cha et al. (issued Oct. 27, 1992) discloses the formation of microcellular plastic foams by using a supercritical fluid as a blowing agent. In a batch process, a plastic article is submerged at pressure in a supercritical fluid for a period of time, and then quickly returned to ambient conditions so as to create a solubility change and nucleation. In a continuous process, a polymeric sheet is extruded and run through a system of time-controlled rollers within a container of supercritical fluid at pressure, and then exposed quickly to ambient conditions. Dynamic seals are stationed between the chambers to allow passage of the thermoplastic sheet while preserving the environmental conditions of each chamber.

The breakthrough in large scale solid-state microcellular thermoplastic production is disclosed in U.S. Pat. No. 5,684,055 to Kumar et al. (issued Nov. 4, 1997), which patent discloses a method for the semi-continuous production of microcellular foamed articles. As disclosed, a roll of polymer sheet is provided with a gas channeling means (e.g., gauze, paper towel) interleaved between the layers of polymer. The interleaved roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet (FIG. 1). A limitation of the semi-continuous method, as acknowledged by Kumar, is that only a finite length of solid thermoplastic material may be processed at one time (to ensure that it is foamed promptly before too much gas escapes the material during its time under ambient conditions, a factor that could lead to undesirable variations in foam density).

U.S. Patent Application Publication No. US2005/0203198 to Branch et al (published. Sep. 5, 2005) discloses another semi-continuous solid-state process that utilizes gas impregnation (similar to that of Kumar et al.) under specialized conditions to enhance foaming and thermoforming of the thermoplastic material.

While the semi-continuous methods as taught by Kumar and Branch address one factor associated with uneven gas concentrations of a thermoplastic roll (namely, within-roll variation in absorption rates of exposed vs. non-exposed surfaces to high pressure gas), there are still other factors that can cause unwanted variations in gas concentration during the absorption or desorption phase or both (which may result in unevenly foamed thermoplastic products). For example, within-roll variation in gas concentration during absorption is believed to be, in part, a function of the stress and volume dilation of the gas impregnated roll (and is applicable to all polymer types).

In addition, high pressure gas saturation of an interleaved thermoplastic roll may also cause: (1) the thermoplastic roll to become heavier and softer (hence weaker), thereby resulting in sagging and greater stress at the top portion of the roll (FIG. 2) and even further within-roll variation in gas absorption rates and gas concentration levels between the top (A) and bottom (B) portions of the roll; (2) volume dilation of the roll whereby the roll expands in volume and begins to compress the interleaved medium to the extent that it loses porosity and, consequently, its gas-permeation function.

Moreover, a saturated interleaved thermoplastic roll with fast gaseous diffusion, whether due to the class of polymer, like polylactic acid (PLA) and polystyrene (PS), or due to the thin dimension (<0.010 inch) of a polymer with moderate diffusivity, tends to desorb gas quickly once it is moved into ambient environment and must be heated substantially immediately to obtain even foaming. If the time between absorption and foaming exceeds the narrow window of processability, within-roll variation of gas concentration across the length of the roll, relative to which end is heated first, may lead to uneven bobble growth and size resulting in a non-uniform microcellular foamed structure and non-uniform density.

Saturated interleaved thermoplastic rolls with moderate gas diffusivity, like polyethylene terephthalate (PET) and polycarbonate (PC), are allowed a longer time between absorption and foaming because they desorb gas at slower rates under ambient conditions. However, between-roll variation, in gas concentration may nevertheless occur if a batch of thermoplastic rolls of moderate gaseous diffusion, which have been saturated with gas and removed from the pressure vessel at the same time, sit too long under ambient conditions on queue to be heated. Each thermoplastic roll that is subsequently foamed has been exposed to ambient conditions longer and thus may experience Incrementally higher redactions in gas concentration. Significant variation in gas concentration between successively heated rolls my result in uneven foam quality among the batch of foamed thermoplastic rolls. The problem of uneven gas concentration in the continuous production of solid-state microcellular thermoplastics is due, in part, to limitations of existing methods and apparatuses (meaning that such methods and apparatuses are not designed to control for any untoward physical events in the thermoplastic material during absorption nor to respond to downstream processing flow by regulating the desorption time). For instance, current pressure vessels used to saturate thermoplastics with high pressure gas are typically designed as a single-chamber cavity with a single-door opening to allow for the insertion and removal of the treated sample. In one embodiment of a single-door, single-chamber pressure vessel, a plurality of interleaved thermoplastic rolls are housed inside the pressure chamber where one or more inlet valves inject high pressure gas (e.g., $CO_2$) into the chamber saturating the thermoplastic rolls until they obtain the desired gas concentration level. Outlet valves then evacuate the gas from the chamber and the door is swung open to remove the saturated rolls from the pressure vessel. This single-door, single-chamber pressure vessel, which constrains the absorption process to a uniform time frame where interleaved thermoplastic rolls are placed inside the pressure vessel at $T_1$, saturated with gas at $T_2$, and evacuated at $T_3$, is not designed for time-sensitive, downstream processing flow.

In another embodiment of the single-door, single-chamber pressure vessel, a plurality of interleaved thermoplastic rolls that have been saturated inside the pressure chamber are taken out of the pressure vessel at different times. Before any of the interleaved thermoplastic rolls can be removed, the pressure vessel must first be depressurized and evacuated of gas. This change inside the pressure vessel environment means that the processing condition of the remainder rolls has been significantly interrupted by depressurization, gas desorption, and subsequent repressurization. In this instance, the single-door, single-chamber pressure vessel is unequal to the demands of production flow while maintaining a constant pressurized environment.

Accordingly, there is a need in the art for novel methods and apparatuses for continuous production of foamed thermoplastic material, with consistent quality in microcellular structure and foam density. The present invention fulfills these needs and provides for further related advantages.

SUMMARY OF THE INVENTION

In brief, the present invention relates to methods and pressure vessels for solid-state microcellular processing of thermoplastic rolls, sheets, and films. In one embodiment, a method for making a gas impregnated interleaved roll comprises: providing a pressure vessel having an internal pressure chamber and a rotatable shaft horizontally positioned within the pressure chamber; placing an interleaved roll about the rotatable shaft and within the pressure chamber, wherein the interleaved roll is made from a thermoplastic material sheet interleaved together with a gas-channeling material sheet; pressurizing the pressure chamber to a selected pressure; rotating the rotatable shaft having the interleaved roll thereabouts while under pressure for a selected period of time; and depressurizing the internal chamber to yield the gas impregnated interleaved roll.

In another embodiment, a method for making a gas impregnated interleaved roll comprises: providing a pressure vessel having an internal pass-through multi-chambered cavity, wherein the multi-chambered cavity includes at least two outer pressure chambers sandwiching a central pressure chamber, and wherein a rotatable shaft is horizontally positioned within each of the two outer and central pressure chambers of the multi-chambered cavity; placing an interleaved roll about the rotatable shaft and within one of the two outer pressure chambers, wherein the interleaved roll is made from a thermoplastic material sheet interleaved together with a gas-channeling material sheet; pressurizing the one of the two outer pressure chamber to a first selected pressure; rotating the rotatable shaft having the interleaved roll thereabouts while under the first selected pressure for a first selected period of time; conveying the interleaved roll to the central pressure chamber while under pressure; rotating the rotatable shall having the interleaved roll thereabouts while under a second selected pressure for a second selected period of time; and depressurizing the other one of the two outer pressure chambers to yield the gas impregnated interleaved roll.

In yet another embodiment, a pressure vessel having an internal, pass-through multi-chambered cavity for gas impregnation of interleaved rolls comprises: at least two outer pressure chambers sandwiching a central pressure chamber, wherein the central pressure chamber is separated from each of the two outer pressure chambers by respective interior doors, and wherein each of the two outer and central pressure chambers are separably procurable to selected first, second, and third pressures, respectively; and a rotatable shaft horizontally positioned within each of the two outer and central pressure chambers and through each of the interior doors of the multi-chambered cavity.

In still yet another embodiment, a pressure vessel having an internal pass-through multi-chambered cavity for gas impregnation of an intermittently fed thermoplastic material sheet comprises: at least two outer pressure chambers sandwiching a central pressure chamber, wherein the central pressure chamber is separated from each of the two outer pressure chambers by respective interior sealable pass-through slots, wherein each of the interior sealable pass-through slots is defined by a rectangular opening having a pair of adjacently positioned confronting static seals for sealably engaging the intermittently fed thermoplastic material sheet, and wherein each of the two outer and central pressure chambers are separably pressurable to selected first, second, and third pressures, respectively; a sealable inlet at a first end portion of the pressure vessel, wherein the sealable inlet is defined by a rectangular inlet slot having a pair of adjacently positioned confronting static seals for sealably engaging the intermittently fed thermoplastic material sheet; a sealable outlet at a second end portion of the pressure vessel, wherein the sealable inlet is defined by a rectangular outlet slot having a pair of adjacently positioned confronting static seals for sealably engaging the intermittently fed thermoplastic material sheet; and a roller system (which may reside partially within and partially outside multi-chambered cavity) for intermittently conveying the thermoplastic material sheet through the sealable inlet, the outer and central pressure chambers by way of the interior sealable pass-through slots, and the sealable outlet.

In still yet another embodiment, a method for gas impregnation of an intermittently fed thermoplastic material sheet comprises: providing a pressure vessel having at least two outer pressure chambers sandwiching a central pressure chamber, wherein the central pressure chamber is separated from each of the two outer pressure chambers by respective interior sealable pass-through slots, wherein each of the interior sealable pass-through slots is defined by a rectangular opening having a pair of adjacently positioned confronting static seals for sealably engaging the intermittently fed thermoplastic material sheet, and wherein each of the two outer and central pressure chambers are separably pressurable to selected first, second, and third pressures, respectively; pressurizing each of the two outer and central pressure chambers to the selected first second, and third pressures; and intermittently feeding the thermoplastic material sheet through each of the two outer and central pressure chambers by way of the interior sealable pass-through slots.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention. For purposes of clarity, like reference numerals have in certain instances been used to designate like features throughout the several views of the drawings.

DETAILED DESCRIPTION OF THE INVENTION

Figure 1:
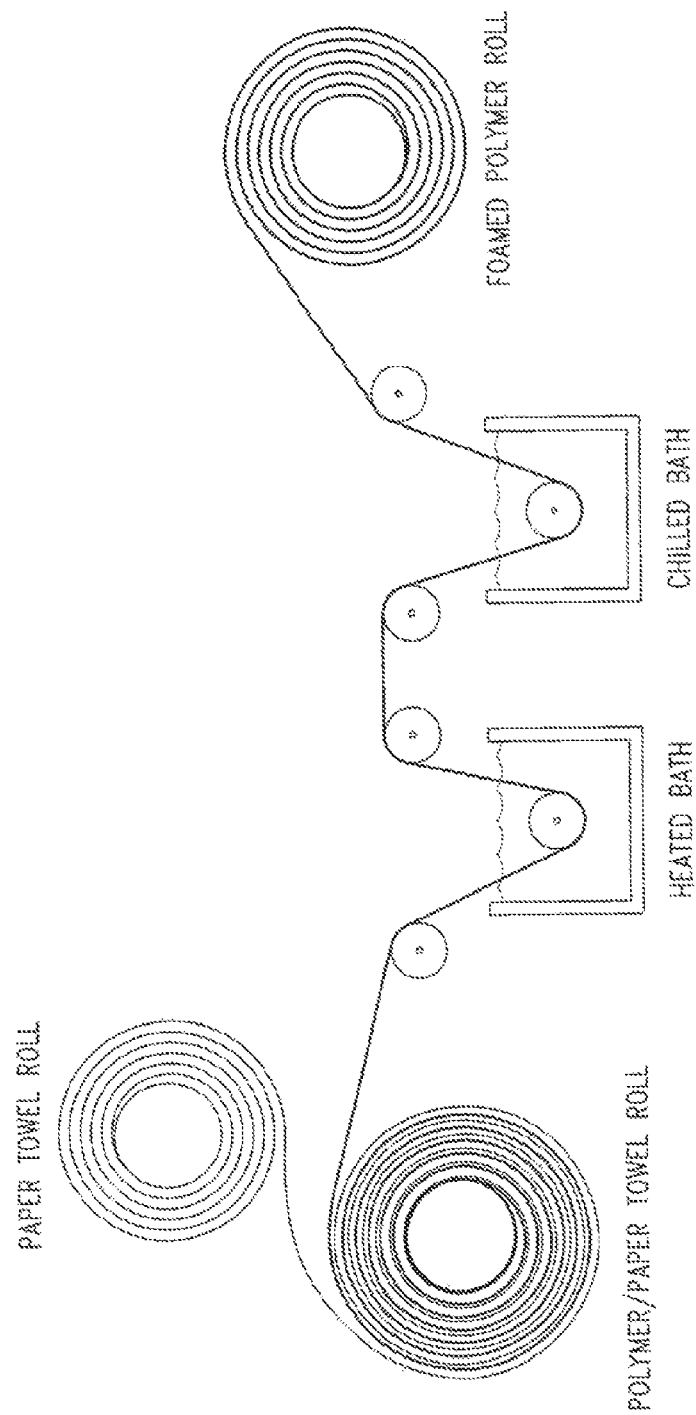
FIG. 1 is schematic view of a semi-continuous method useful for making solid-state microcellular foamed rolls/sheets in accordance with the prior art.
Figure 2:
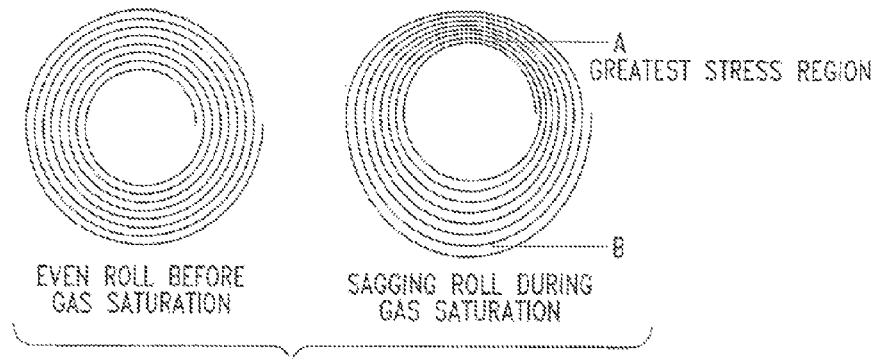
FIG. 2 is an end view of an interleaved thermoplastic material roll before and during gas saturation in accordance with the prior art.
Figure 3:
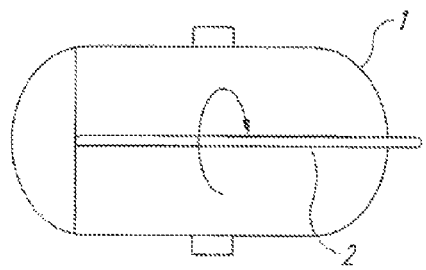
FIG. 3 is a side view of a pressure vessel having a rotatable shaft in accordance with an embodiment of the present invention.

The present invention relates to various methods and pressure vessels for solid-state microcellular processing of thermoplastic rolls, sheets, and films. Thus, and with reference to FIG. 3, the present invention in a first embodiment is directed to a method for making a gas impregnated interleaved roll, which method comprises at least the following steps: providing a pressure vessel 1 having an internal pressure chamber and a rotatable shaft 2 horizontally positioned within the pressure chamber; placing an interleaved roll (having a diameter ranging from about 10 to about 16 inches) about the rotatable shaft 2 and within the pressure chamber, wherein the interleaved roll is made from a thermoplastic material sheet (having a thickness of about 0.01 to about 0.1 inches) interleaved together with a gas-channeling material sheet (having a thickness of about 0.01 to about 0.05 inches); pressurizing the pressure chamber to a selected pressure (with an effective amount of a plasticizing gas such as, for example, $CO_2$ or $N_2$); rotating the rotatable shaft having the interleaved roll thereabouts (thereby rotating the interleaved roll) while under pressure for a selected period of time; and depressurizing the internal chamber to yield the gas impregnated interleaved roll. The pressure generally ranges from about 0.345 MPa to about 9.65 MPa (or more preferably from about 3.5 MPa to about 7.1 MPa), add the temperature is generally room temperature (but may range from about −20° F. to about 150° F.). Depending on the selected thermoplastic material and roll diameter (which generally ranges from about 10 in about 16 inches), gas, pressure, and temperature, the period of time generally ranges from about a few hours to well over a hundred hours.

This method and related pressure vessel are intended for (but not limited to) processing solid-state polymers with relatively slow gas diffusivity, saturation time ($T_s$) greater than 10 hours, like polyetherimide (PEI) and polyetherketoneketone (PEKK). The single-door, single-chamber pressure vessel 1 having a rotating spit or shaft 2 (FIG. 3) in which one or more thermoplastic film rolls, interleaved with a gas-channeling medium, are inserted through the shaft 2 inside the pressure chamber, treated with high pressure inert gas, and evacuated to be foamed. This pressure vessel is specifically adapted for processing interleaved thermoplastic rolls with slow gas diffusivity that may experience within-roll variation in gas concentration during absorption. The shaft turns the roll as it is being supplied with gas in order to combat the effects of sagging and stress on the roll from the saturating gas and loss of porosity in the interleave medium due to compression from the roll's expanding volume, all of which can adversely impact gas absorption and lead to undesirable variations in gas concentration of the thermoplastic roll.

Figure 4:
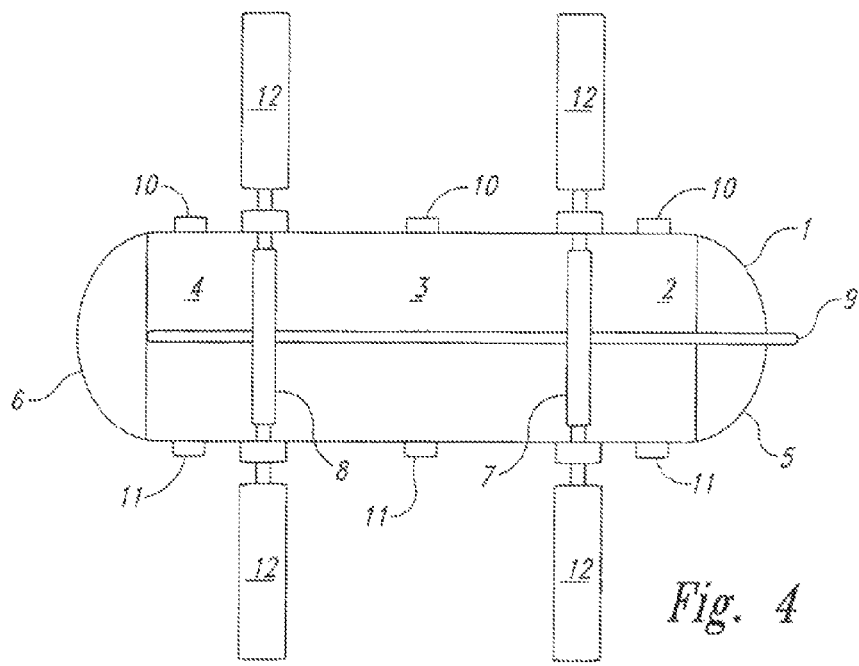
FIG. 4 is a side view of a pass-through, multi-chamber pressure vessel having a rotatable shaft in accordance with an embodiment of the present invention.

In another embodiment and with reference to FIG. 4, the present invention is directed to a method for making a gas impregnated interleaved roll, which method comprises at least the following steps: providing a pressure vessel having an internal pass-through multi-chambered cavity, wherein the multi-chambered cavity includes at least two outer pressure chambers sandwiching a central pressure chamber, and wherein a rotatable shaft is horizontally positioned within each of the two outer and central pressure chambers of the multi-chambered cavity; placing an interleaved roll about the rotatable shaft and within one of the two outer pressure chambers, wherein the interleaved roll is made from a thermoplastic material sheet (having a thickness of about 0.01 to about 0.1 inches) interleaved together with a gas-channeling material sheet (having a thickness of about 0.01 to about 0.05 inches); pressurizing the one of the two outer pressure chamber to a first selected pressure; rotating the rotatable shaft having the interleaved roll thereabouts while under the first selected pressure for a first selected period of time; conveying the interleaved roll to the central pressure chamber while under pressure; rotating the rotatable shaft having the interleaved roll thereabouts while under a second selected pressure for a second selected period of time; and depressurizing the other one of the two outer pressure chambers to yield the gas impregnated interleaved roll. The gas may be $CO_2$ or $N_2$, for example. The pressures generally range from about 0.345 MPa to about 9.65 MPa (or more preferably from about 3.5 MPa to about 7.1 MPa), and the temperatures are generally room temperatures (but may range from about −20° F. to about 150° F.). Depending on the selected thermoplastic material and roll diameter (which generally ranges from about 10 to about 16 inches), gas, pressures, and temperatures, the period of time generally ranges from about a few hours to well over a hundred hours.

Figure 5:
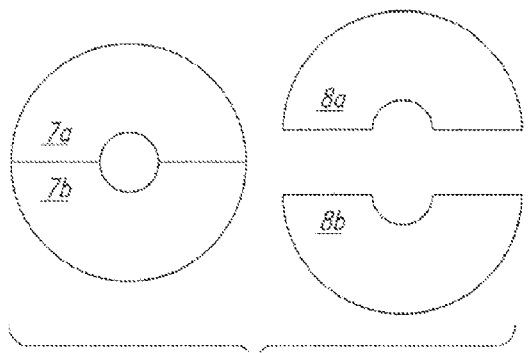
FIG. 5 is a sectional view of the interior door (closed and opened) of the pass through, multi-chamber pressure vessel of FIG. 4.

This method and related pressure vessel are intended for (but not limited to) processing solid-state polymers with moderate gas diffusivity (1 hr<$T_s$<10 hrs), like polyethylene terephthalate (PET), polystyrene (PS), polycarbonate (PC), and acrylonitrile butadiene styrene (ABS). As shown in FIG. 4, the pressure vessel includes an extended, pass-through multi-chambered cavity 1 segmented into three chambers 2, 3, 4 with a rotatable shaft 9 extending across all three chambers. The outer chambers 2, 4 sandwich the interior chamber 3. In this embodiment there are four sealed doors. The two solid exterior doors 5 and 6 open into the outer chambers 2 and 4, respectively. The interior doors 7 and 8 allow access to chamber 3 as well as access to the outer chambers 2 and 4, respectively. The interior doors 7, 8 include dual panels that slide outward to open and inward to close (FIG. 5). In one embodiment the interior doors are connected to hydraulic cylinders 12 used to pull open and to seal shut the doors (FIG. 4).

This pressure vessel is adapted specifically for processing interleaved thermoplastic rolls with moderate diffusivity that may experience within-roll variation during absorption and between-roll variation during desorption. Designed for large scale thermoplastic production, this pressure vessel allows interleaved thermoplastic rolls to he inserted, advanced, and removed from the pressure vessel on demand; performs uniform gas saturation via a rotatable shaft on multiple interleaved thermoplastic rolls; and stores the rolls in a high pressure environment until they are ready for removal. In short, the design of the pressure vessel allows for better streamlining and control over the absorption process and better regulation of desorption time through its storage and conveyance capabilities. For example, chamber 2 initially houses the thermoplastic roll; chamber 3 is reserved for high pressure gas saturation and can store multiple interleaved thermoplastic rolls; and chamber 4 is reserved to remove the roll after saturation. The rotatable shaft 9 (with optional screw thread on which each roll may be hung) is used to transport the roll from one chamber to the next and to rotate the roll during saturation to allow for uniform gas absorption. One or more inlet valves 10 are stationed at each chamber to inject high pressure gas, and one or more outlet valves 11 in each chamber to evacuate the gas. Each chamber has its own separate controls (not shown) for its inlet and outlet valves. The doors allow entry into and exit from the chambers; the interior doors 7, 8 are designed to seal in the interior chamber 3 in order to maintain chamber's 3 high pressure environment whenever any of the exterior doors 5, 6 from chambers 2, 4, respectively, is opened.

As an example, when the pressure vessel is operating, all three chambers 2, 3, 4 are uniformly injected with high pressure gas at the same gas concentration level and pressure. The exterior doors 5, 6 are closed shut and the interior doors 7, 8 are either opened or shut. When the interleaved thermoplastic roll is first placed inside the pressure vessel from the outer chamber 2, the interior doors 7, 8 of the interior chamber 3 are closed to seal in chamber's 3 pressurized environment. Gas from chamber 2 is evacuated and the exterior door 5 is opened to allow the interleaved thermoplastic roll to be inserted through the rotatable shaft 9 inside chamber 2. High pressure gas is then re-injected into chamber 2 until it reaches the same gas pressure level as the interior chamber 3, at which time the interior doors 7, 8 are opened, and the rotating shaft 9 advances the thermoplastic roll into chamber 3, where the roll is saturated with high pressure gas until it reaches the desired gas concentration. The thermoplastic roll sits in chamber 3 until it is ready for removal, at which time the roll is advanced to outer chamber 4, the interior doors 7, 8 are sealed shut, gas from chamber 4 is evacuated, and die exterior door 6 is opened to remove the roll. For the entire time, the interior chamber 3 is continuously saturated with high pressure gas to ensure a constant pressurized environment so that the thermoplastic roll maintains its gas concentration level.

Figure 6:
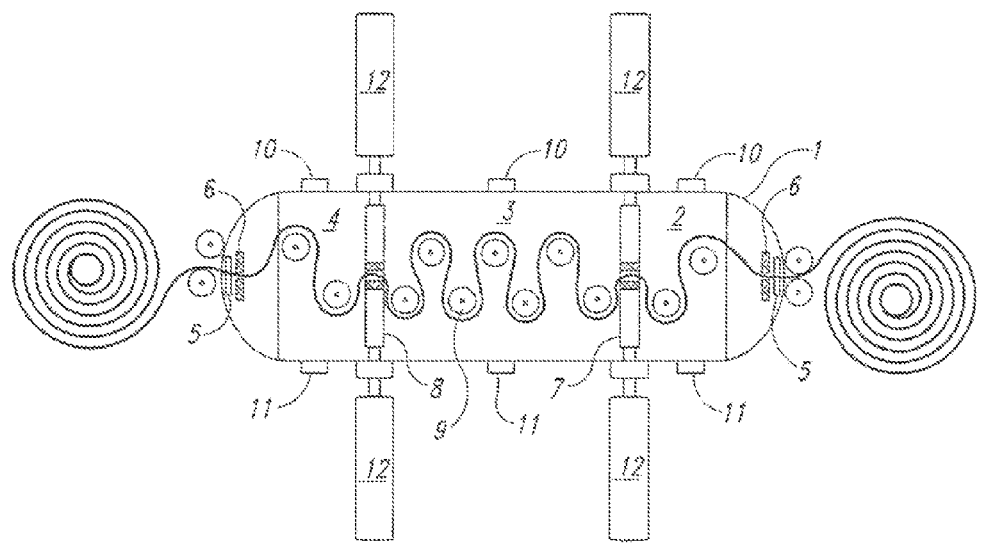
FIG. 6 is a side view of a thermoplastic roll being fed through a pass-through, multi-chamber pressure vessel having a roller system (and being rewound into a gas impregnated roll) in accordance with an embodiment of the present invention.

In another embodiment of a multi-chamber pressure vessel (FIG. 6), the pressure vessel 1 includes an open-ended, three-chamber cavity 2, 3, 4 with a system of rollers 9 that extends across all three chambers. The ends of the cavity are rectangular slots 5 with static seals 6 used to open and seal shut the outer chambers 2, 4. The rectangular slot allows for a thermoplastic roll to be fed into the outer chamber 2 at one end of die pressure vessel, advanced to the interior chamber 3 to be saturated with high pressure gas, and stored until it is ready for removal at the other end of the pressure vessel from the outer chamber 4 through a rectangular slot. Like the embodiment of a multi-chamber pressure vessel, this embodiment includes an interior chamber with two dual-panel doors 7, 8 operated by hydraulic cylinders. The doors maintain the interior chamber's pressurized environment by sealing off the chamber whenever the outer chambers are opened to insert or evacuate the thermoplastic roll. There are also inlet 10 and outlet 11 valves for each chamber.

Figure 7:
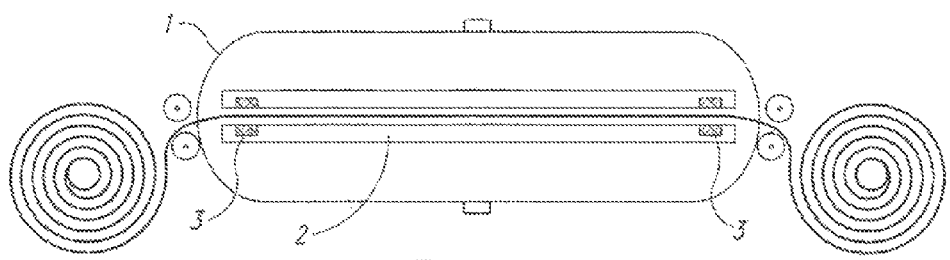
FIG. 7 is a side view of a thermoplastic roll being fed through an elongated pressure vessel having an open-ended rectangular cavity and static seals (and being rewound into a gas impregnated roll) in accordance with an embodiment of the present invention.
Figure 8:
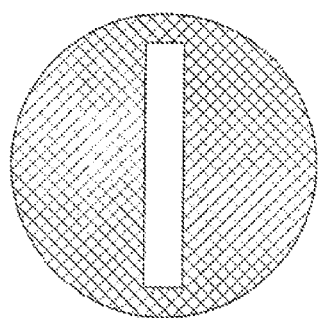
FIG. 8 is a sectional view of the rectangular cavity of FIG. 7.
Figure 9:
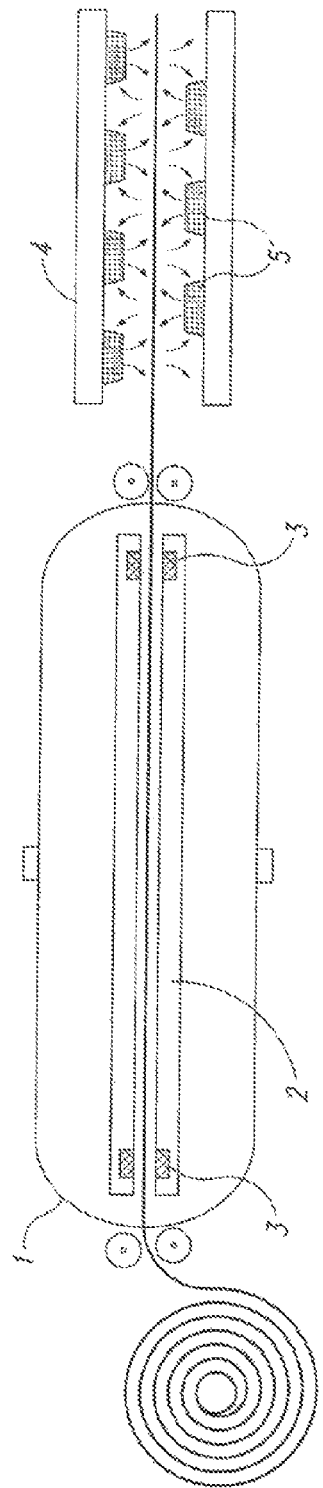
FIG. 9 is a side view of a thermoplastic roll being fed through an elongated pressure vessel having an open-ended rectangular cavity and static seals (and being foamed by exposure to a heat source) in accordance with an embodiment of the present invention.

In another embodiment and with reference to FIG. 7, the present invention is directed to an intermittent saturation system whereby a solid-state thermoplastic roll with fast diffusivity is intermittently fed through an open-ended rectangular cavity 2 with rectangular slot (FIG. 8) of a long pressure vessel 1. The pressure vessel is filled with solid filler material that surrounds the cavity to eliminate the volumetric space that would otherwise be saturated with high pressure gas. The rectangular cavity 2 stretches from one end of the pressure vessel to the other and is lined throughout with a porous gas-channeling material to allow uniform absorption on all surfaces of the thermoplastic film. Static seals 3, located at opposite ends of the pressure vessel to seal shut the pressure vessel, integrally sandwiches the thermoplastic film as high pressure gas is supplied to the pressure vessel to allow gas to diffuse evenly into the thermoplastic film until it reaches the desired gas concentration level. When the film is ready to be removed for the next step, the pressure vessel is evacuated of gas, the static seals are disengaged, and the film is advanced on the exit end to be re-rolled (FIG. 7). in another embodiment (FIG. 9), the saturated film is passed through a flotation air oven 4 that injects hot air in through the air nozzles 5. The air nozzles 5, which are positioned at the top and bottom of the oven, blow hot air as the film passes, causing the film to foam into evenly flat foamed thermoplastic sheets.

Figure 10:
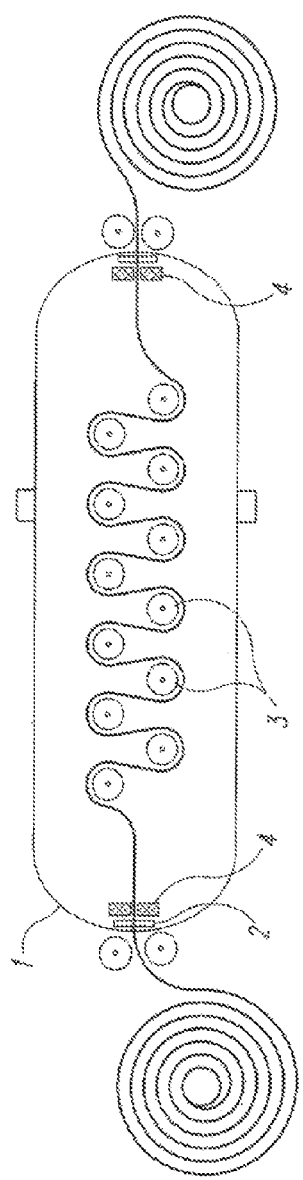
FIG. 10 is a side view of a thermoplastic roll being fed through pressure vessel having a roller system (and being rewound into a gas impregnated roll) in accordance with an embodiment of the present invention.
Figure 11:
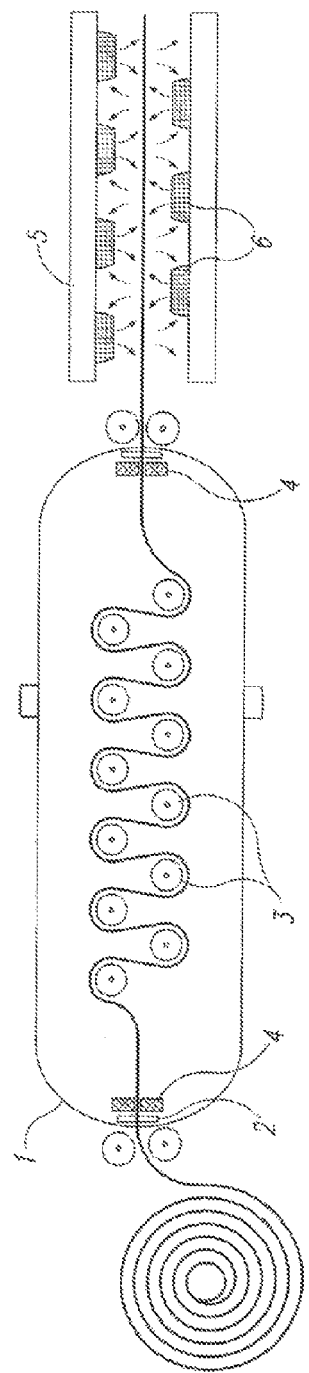
FIG. 11 is a side view of a thermoplastic roll being fed through pressure vessel having a roller system (and being foamed by exposure to a heat source) in accordance with an embodiment of the present invention.

In yet another embodiment of an intermittent saturation system (FIG. 10), a long pressure vessel 1 includes an open-ended cavity with rectangular slots 2 that extends across the length of the pressure vessel. A thermoplastic roll interleaved with a gas-channeling medium is fed into the cavity and passed through a system of rollers 3 like a festooned web. Again, static seals 4 located at opposite ends of the pressure vessel are used to clamp down the thermoplastic web and to saturate the web with high pressure gas. The static seals are disengaged, and the film is re-rolled on the exit end (FIG. 10) or, in another embodiment, passed through a flotation air oven 5 (FIG. 11) where the hot air supplied by the air nozzles 6 causes the film to foam into evenly flat foamed thermoplastic sheets.

The various embodiments disclosed herein provide alternative methods and apparatuses for addressing the problem of uneven gas concentration among solid-state thermoplastics with different gas diffusivity rates. A first aspect relates to a pressure vessel having a rotatable shaft for polymers with slow gas-diffusing rates. The shaft rotates the interleaved thermoplastic roll as it is saturated with high pressure gas in order to prevent the roll from sagging and from compressing the interleaved medium, factors which can lead to uneven gas absorption of the interleaved thermoplastic roll. A second aspect relates to a multi-chamber pressure vessel with a rotatable shaft or roller system for polymers with moderate gas-diffusing rates, which may experience uneven gas concentration during the absorption and desorption phase. The multi-chamber pressure vessel allows for greater flexibility and control over the absorption and desorption process and is more responsive in its ability to insert, saturate, store, and evacuate a thermoplastic roll on demand. A third aspect relates to a long pressure vessel with an open-ended cavity and static seals for processing polymers with fast-diffusing, fast-desorblng rates. It provides an intermittent saturation system whereby a thermoplastic sheet or web is inserted into the rectangular cavity of the pressure vessel or through a system of rollers, fastened down by static seals, and uniformly exposed to high pressure gas.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for gas impregnation of an intermittently fed thermoplastic material sheet, comprising:
   providing a pressure vessel having at least two outer pressure chambers sandwiching a central pressure chamber, wherein the central pressure chamber is separated from each of the two outer pressure chambers by respective interior sealable pass-through slots, wherein each of the interior sealable pass-through slots is defined by a rectangular opening having a pair of adjacently positioned confronting static seals for sealably engaging the intermittently fed thermoplastic material sheet, and wherein each of the two outer and central pressure chambers are separably pressurable to selected first, second, and third pressures, respectively;
   pressurizing each of the two outer and central pressure chambers to the selected first, second, and third pressures; and
   intermittently feeding the thermoplastic material sheet through each of the two outer and central pressure chambers by way of the interior sealable pass-through slots.

2. The method of claim 1 wherein the selected first, second, and third pressures each range from about 3.5 MPa to about 7.1 MPa.

3. The method of claim 2 wherein the selected first, second, and third pressures are each about the same.

* * * * *